(No Model.) 5 Sheets—Sheet 3.
C. P. BALL, D. E. SWEETSER & G. H. BALL.
AUTOMATIC LATHE.
No. 593,066. Patented Nov. 2, 1897.
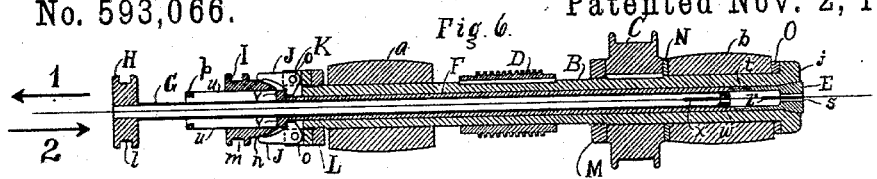
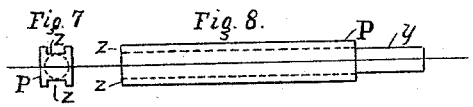
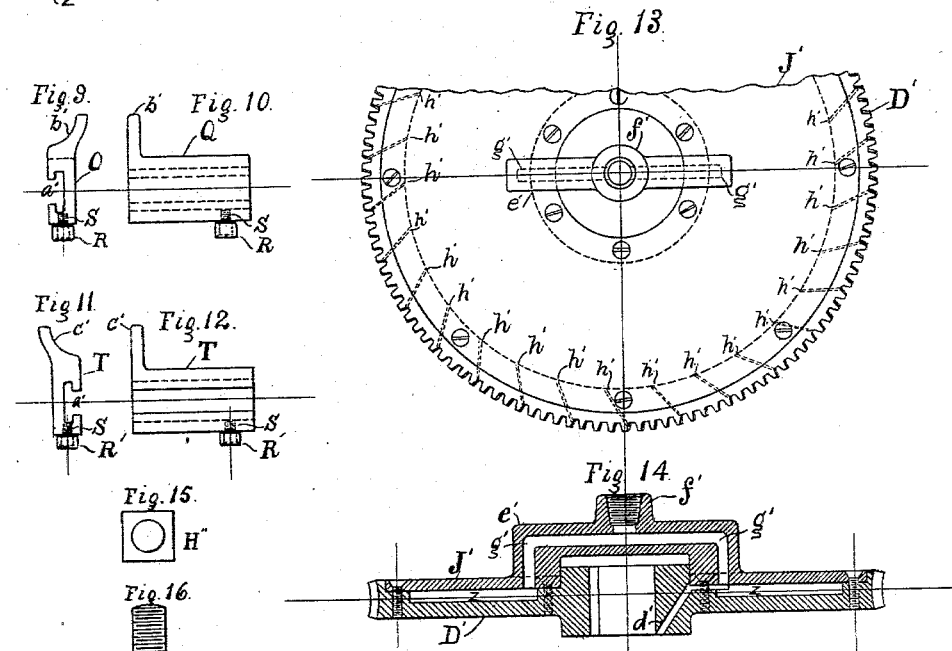
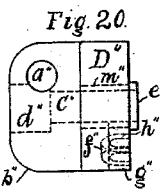
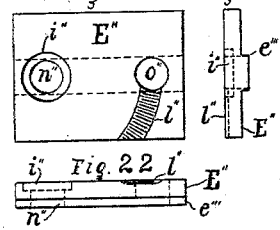
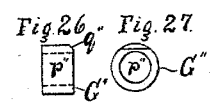
Witnesses.
Tudor Goudy
Willis Goudy
Inventors
Charles P. Ball
Dwight E. Sweetser
George H. Ball

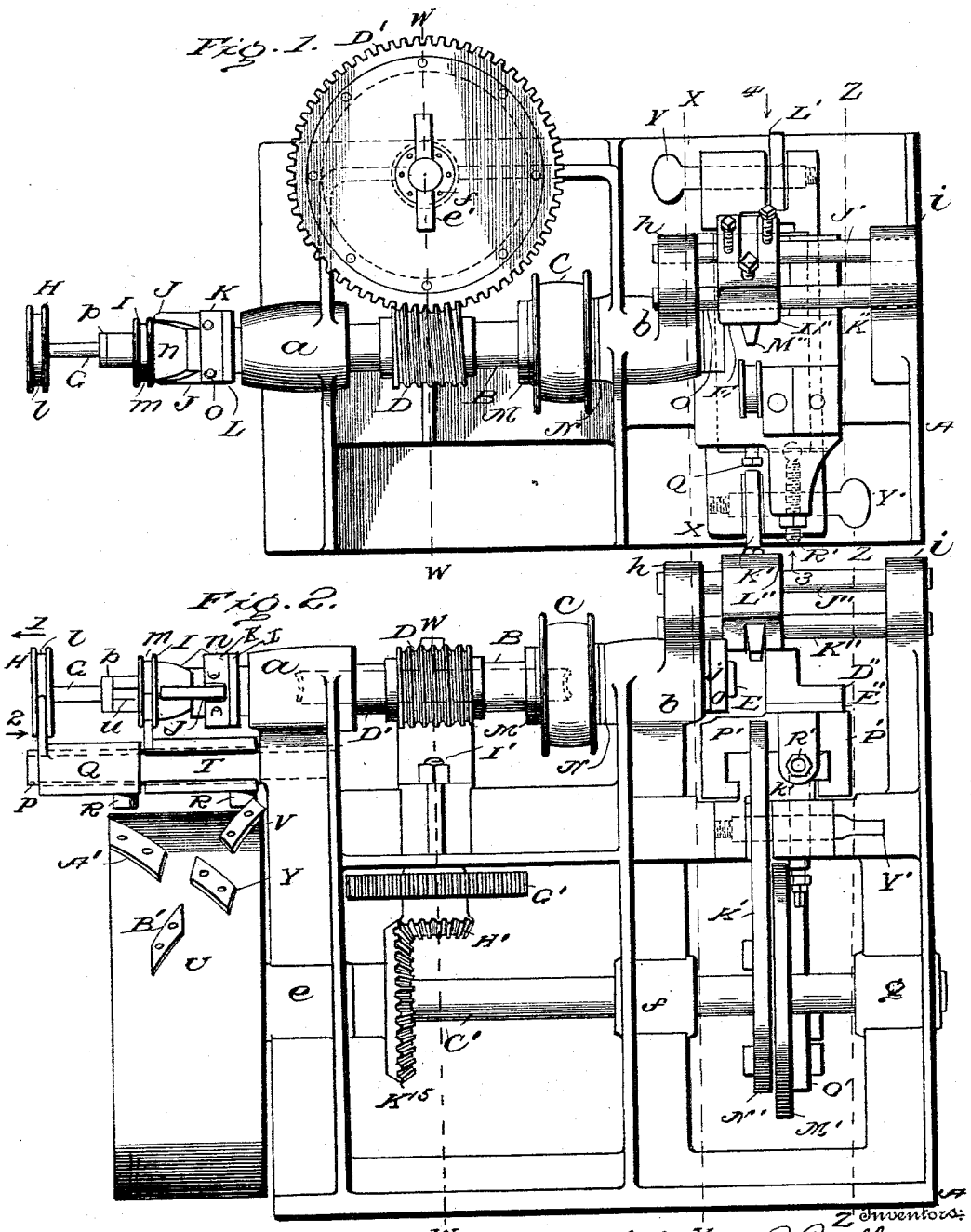

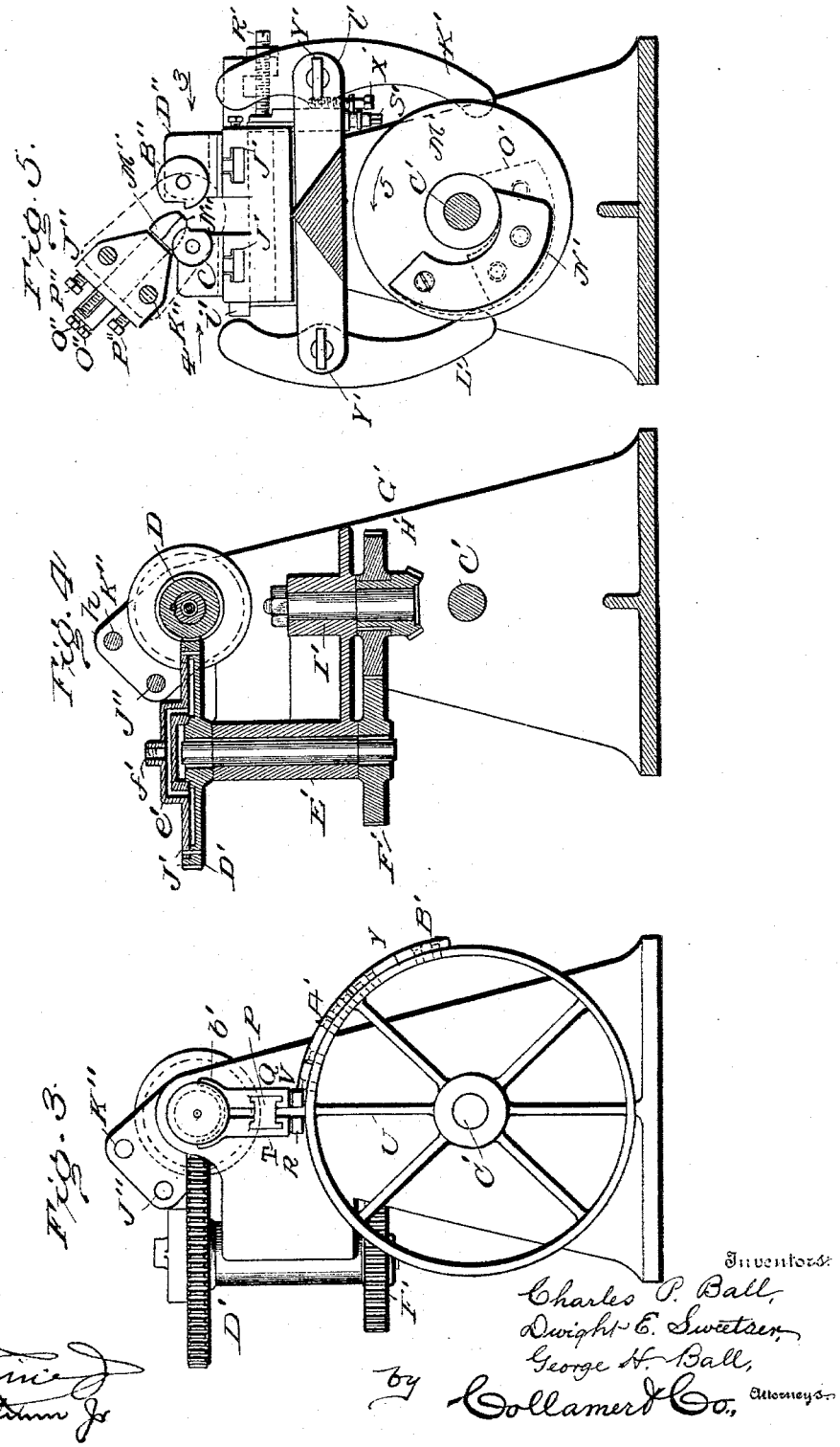

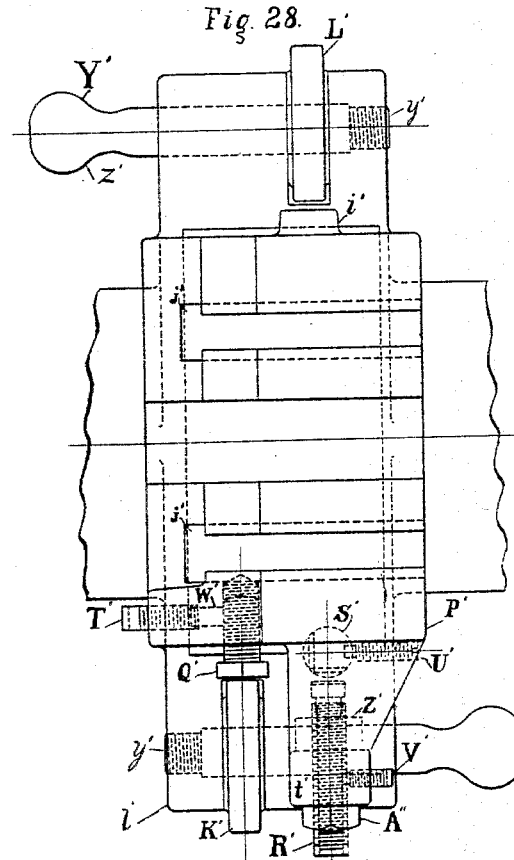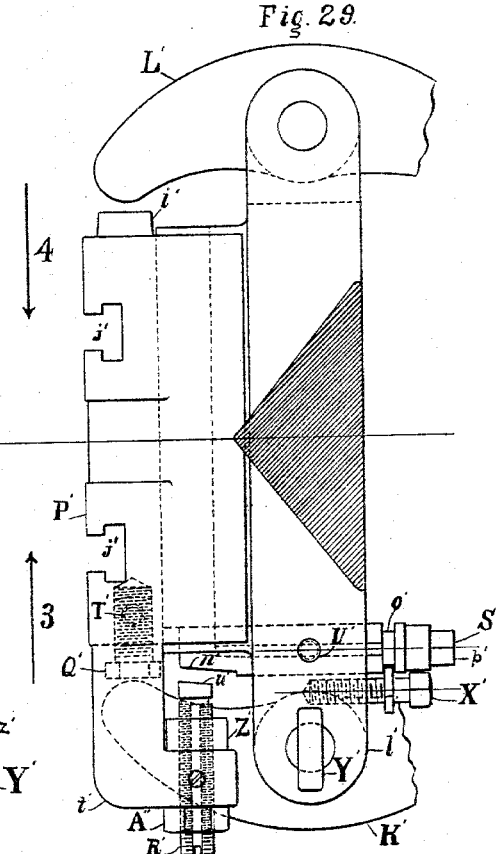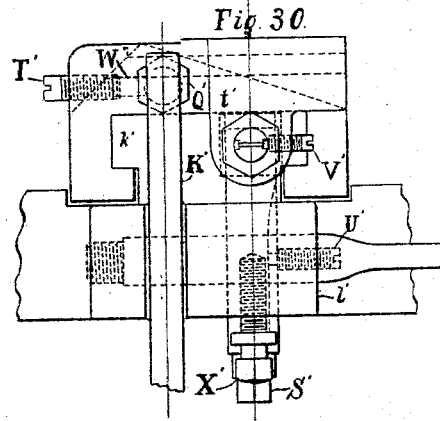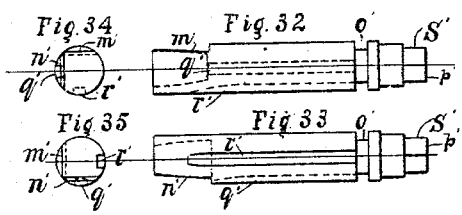

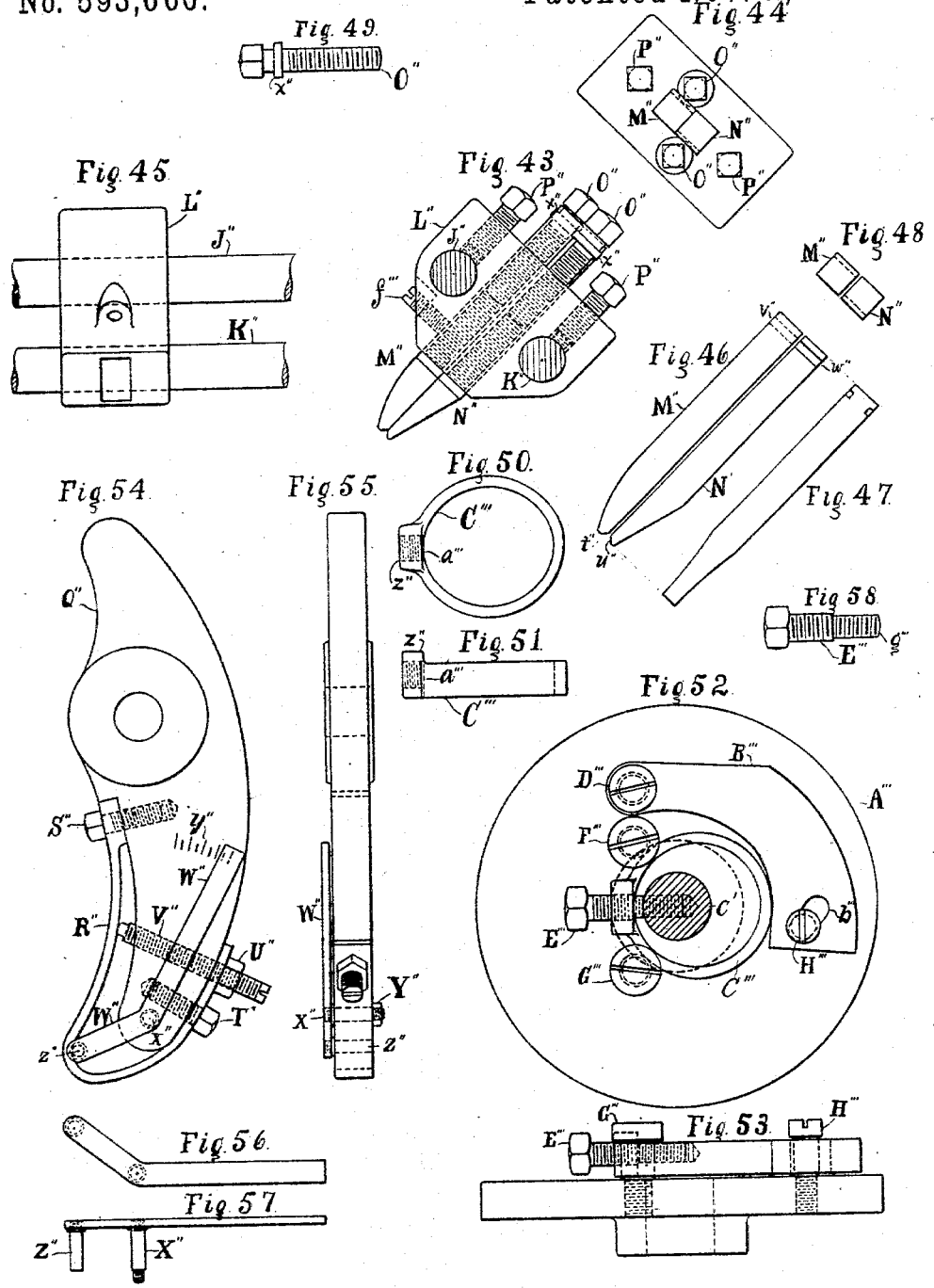

United States Patent Office.

CHARLES P. BALL, DWIGHT E. SWEETSER, AND GEORGE H. BALL, OF ENFIELD, CONNECTICUT; SAID SWEETSER AND SAID GEORGE H. BALL ASSIGNORS TO SAID CHARLES P. BALL.

AUTOMATIC LATHE.

SPECIFICATION forming part of Letters Patent No. 593,066, dated November 2, 1897.

Application filed December 5, 1896. Serial No. 614,625. (No model.)

*To all whom it may concern:*

Be it known that we, CHARLES P. BALL, DWIGHT E. SWEETSER, and GEORGE H. BALL, of Enfield, in the county of Hartford and the State of Connecticut, have invented new and useful Improvements in Automatic Lathes, of which the following is a specification, with reference to the accompanying drawings.

Figure 1 is a plan of the machine. Fig. 2 is a side elevation. Fig. 3 is an end elevation. Fig. 4 is a cross-section on line W W. Fig. 5 is a cross-section on line X X, that part of the bearing $b$ and the spindle B through which the section-line passes not being shown. Fig. 6 is an enlarged sectional plan through the spindle. Figs. 7 to 58, inclusive, are detailed illustrations of parts which will be referred to farther on.

The machine which we describe gages, finishes, and cuts off its work and feeds itself by the automatic action of the different parts. The material which is used for stock is fed to the machine in long rods, which are run through the spindle.

We do not claim anything original in the spindle or in the manner of feeding the stock, as we propose to make these parts of the machine similar to those already in use; but we insert a brief description and illustrations of the spindle in order to show how the machine feeds itself, and also in order to show the connection between this part of the machine and other parts which we do claim as original.

B is the tubular spindle, revolving in bearings $a$ and $b$ on the main frame and driven by the pulley C, between which latter and the bearing $b$ a washer N is interposed, while a wear-nut M stands at the opposite side of the pulley. The end of the spindle projecting beyond the bearing $b$ carries a washer O, beyond which it is enlarged, as at $j$, and its interior is also here enlarged for the reception of the tapering hollow steel collet E. The latter is split at its outer end, as at $r$, to form jaws, which grasp the work, as at $s$, as will be understood, while its inner end is threaded, as at $t$, onto the tubular plunger F. Through the latter passes the feed-pipe G, split at its forward end, as at $x$, to form jaws $w$, for grasping the work within the plunger F, while its rear end carries the head H, formed with the groove $l$.

The spindle B is slotted, as at $u$, from its inner end $p$ to the nut L, and the plunger F is keyed by projections $v$ to these slots.

J are pawls pivoted at $o$ to the finger-block K, which is adjusted by the nut L, one end of the pawls engaging the projections $v$ and the other end riding on the spheroidal surface $n$ of a sleeve I, which is journaled loosely on the spindle and formed with a groove $m$.

P is a bracket whose end $y$, Fig. 8, is mounted in the frame and whose body $z$ is angular, as seen in Fig. 7, and onto the body are fitted for sliding the grooves $a'$ of the feed-pipe slide Q and the plunger-slide T, Figs. 9 to 12. The former has an arm $b'$, engaging the groove $l$ in the head H, and the latter an arm $c'$, engaging the groove $m$ in the sleeve I. On pins S in these slides are mounted rollers R and R', adapted to be engaged by cams V, Y, A', and B' on the drum U. (See Fig. 2.)

The drum U is keyed to the drum-shaft C', and the method of driving this shaft is one of the original features of our invention. It has been customary on machines of this class to drive the drum-shaft C' by a belt from the counter-shaft independent of the belt which drives the spindle-pulley C. Practical experience has demonstrated that there are several serious objections to this manner of driving the drum-shaft and has also shown that a definite ratio should be maintained between the speed of the spindle and the speed of the drum-shaft. Such a speed-ratio cannot very well be maintained by driving one independently of the other by means of belts, but it can be maintained by driving the drum-shaft from the spindle by means of intermediate gearing in the manner which we will now describe.

The worm D on the spindle B drives the worm-wheel D', which is keyed to the upright shaft E'. The cog-wheel F' is keyed to the lower end of this shaft and drives the cog-wheel G', which is keyed to the hub of the bevel-toothed wheel H'. The bevel-toothed wheel H', revolving on the stud I', drives the bevel-toothed wheel $K^{15}$, which is keyed to the drum-shaft C'. As the worm D revolves very fast, a special device is necessary to keep its surface lubricated. As shown in Figs. 13 and 14, the cover J' fits into a recess in the body of the worm-wheel D' and covers an annular reservoir z, which may be filled with any convenient absorbent. A channel d' connects the reservoir z with the interior of the hub of the worm-wheel D', and through it oil can run from the reservoir z to lubricate the bearing of the shaft E'. A boss e' of rectangular cross-sections projects from the cover J, with a filling-nipple f' on its center. The nipple f' is tapped with a pipe-thread of suitable size to receive any desired oil-cup. The recess in the boss e' is connected by channels g' g' to the oil-reservoir z in the worm-wheel D', so that the oil can be regularly supplied to this reservoir in any desired quantities. Small holes h' h', &c., are drilled from the flanks of certain teeth into the reservoir z. These teeth thus provided with oil-passages should be evenly distributed and there should be enough of them to secure a suitable lubrication of the worm D.

The drum-shaft C' carries the cam-disk M'. Two pieces of steel N' and O', commonly called "cams," are bolted on opposite sides of this disk to strike levers K' and L'. The usual position, arrangement, and shape of these parts are shown in Fig. 5, but we have devised an improved form of cam and lever, described below.

As will be seen, the shape of the cams N' and O' are such that as the cam-disk revolves in the direction indicated by the arrow 5 that part of each cam which first strikes the opposing lever is nearer the center of the cam-disk than that part of the cam which is last in contact with the opposing lever. The lever K' is hung on the pin Y', having one end y' threaded and the other end z' formed into a handpiece, being suspended at the front side of the machine and at the proper position with reference to the cam-disk M', so that as the cam-disk revolves the cam N' will strike the lower end of the lever K'. A lever L' is similarly suspended from the back side of the machine at a proper position, so that as the cam-disk revolves the cam O' will strike the lower end of the lever.

The cams N' and O' are of such shape and so adjusted on the cam-disk that the action of each is to force outward from the center of the machine that end of the lever with which it comes in contact, and they are also adjusted so that only one of them is in contact with the lever at any time, so that when the lower end of one lever is being forced outward the lower end of the opposite lever is free to swing inward toward the center of the machine. When the lower end of the lever K' is forced outward, the upper end swings inward and striking the adjusting-screw Q' in the cross-carriage P' it drives the cross-carriage P' in the direction indicated by the arrow 3, Figs. 5, 28, and 29. When the lower end of the lever l' is forced outward, the upper end of the lever swings inward, striking the boss i' on the carriage P', which forces the carriage P' in the direction indicated by the arrow 4. The carriage P' has two T-slots j' j', in which the tool-holders are clamped, as will be explained hereinafter. The carriage P' fits over a T-shaped projection k' on the frame, which holds and guides the carriage in its travel, as shown. The forward and backward movements of the carriage are for the purpose of feeding the tools on either side of the center. The tool C" on the back end of the carriage or the end from which the boss i' projects, we will suppose, is used only for cutting off the work, and no very fine adjustment is required to govern the travel of the cross-carriage P' in the direction indicated by the arrow 4. The tool B" on the front end of the carriage, we will suppose, is expected to form and gage the work, and very fine adjustments are required to regulate the travel of the carriage when moving in the direction indicated by the arrow 3.

The cam N' should be so located on the cam-disk M' that the throw of the lever K' will be about right to drive the carriage P' so far as desired in the direction of the arrow 3. If, however, the carriage should travel a little too far or not quite far enough, the travel can be regulated by turning the set-screw Q', which is adjusted in one end of the carriage, as shown.

A set-screw T' is adjusted in a hole in the frame at right angles and opposite to the set-screw Q', a short plug W', of brass or other soft metal, being fitted into this hole, one end of the plug W' being in contact with the threads of the set-screw Q'.

The adjustment of the set-screw Q' regulates the travel of the carriage P' only so far as the travel of the carriage is due to the action of the lever K'; but as the carriage P' may continue to be drawn forward by the action of the tool after the lever K' has ceased to drive it it is necessary to have some independent and positive device on the carriage which will stop its travel at the instant the lever K' ceases to drive it.

Attempts have been made heretofore to stop the travel of the carriage by a set-screw which is so adjusted in the carriage that the end of it will strike some fixed surface on the frame of the machine at the instant the lever K' ceases to drive the carriage; but a set-screw is not readily adjusted to one-thousandth of an inch and some finer adjustment is required.

We secure a very fine adjustment in the following manner: The lever K' is hung from the lug l', which projects from the frame. The pin S' is passed through the lug l', the center of the pin being about on a line with the edge of the T-shaped projection k', and that part of the pin which projects beyond the lug l' toward the carriage being supported by a semicircular recess in the end of the T-shaped projection k', said semicircular recess in the end of the T-shaped projection $k'$ being a continuation of and of the same radius as the hole in the lug $l'$, in which the pin S' is inserted. At one end of the pin S', as shown in Figs. 32 to 35, inclusive, a surface $m'$ is milled, said surface being cut at a slight angle to the center of the pin and the inclination of the surface being toward the lower end of the pin S' when it is in position. At right angles to the surface $m'$ the surface $n'$ is milled, also at a slight angle to the center of the pin, the inclination of the surface being toward the upper end of the pin S' when it is in position. The inclination of these two surfaces $m'$ and $n'$ toward the center of the pin S' should be the same, although pitched in opposite directions. A groove $o'$ is turned in the lower end of the pin S' to fit the collar of a collar-screw X', which is adjusted by a screw-thread in the lug $l'$ at a suitable distance from the pin S'. Below the groove $o'$ the shape of the pin S' is adapted to give sufficient clearance to the head of the collar-screw X', and at the end $p'$ four flat surfaces are milled at right angles to each other, so that the pins may be turned by a wrench. Two grooves $q'$ and $r'$ being, respectively, at ninety degrees from the centers of the two surfaces $m'$ and $n'$ run lengthwise the pin. The locking set-screw U' is adjusted by a screw-thread in the frame at right angles to the pin S', and the end $s'$ of the set-screw U', Fig. 38, is made to fit the grooves $q'$ and $r'$ on the surface of the pin S'. The set-screw R' passes through the lug $t'$, extending from the carriage opposite the pin S'. The surface $u'$ on the head of the set-screw R' is cut at such an angle that it may be adjusted so as to be parallel to the opposite surface $m'$ or $n'$ on the pin S'. The set-screw R' is adjusted by a screw-thread in a square nut Z', and it is held in position by the check-nut A''. The edge of the nut Z' is in contact with the lug $t'$, so that it is prevented from turning. The outer end of the set-screw R' is slotted, so that it may be adjusted in the nut Z' by a screw-driver.

Two grooves $v'$ and $w'$ run lengthwise and on opposite sides of the set-screw R', and into either of these grooves the end $x'$ of the locking set-screw V' is fitted. The locking set-screw V' is adjusted by a screw-thread in the lug $t'$ at right angles to the set-screw R'. The location of the two grooves $v'$ and $w'$ and the position of the locking set-screw V' are so determined with reference to the beveled face $u'$ on the head of the set-screw R', and the position of the set-screw U' is so determined with reference to the beveled surfaces $m'$ and $n'$ on the pin S', that when the end of the locking set-screw V' is adjusted in the groove $w'$ of the set-screw R', and when the locking set-screw U' is adjusted in the groove $r'$ of the pin S', the surface $u'$ on the head of the set-screw R' is parallel to the surface $n'$ on the pin S', and when the set-screw R' has been turned half a revolution and the end of the locking set-screw V' is fitted in the groove $v'$, and when the pin S' has been turned one-quarter of a revolution and the end of the set-screw U' is adjusted in the groove $q'$ the surface $u'$ on the head of the set-screw R' is parallel to the surface $m'$ on the pin S'.

The carriage P' will travel in the direction indicated by the arrow 3 until the head of the set-screw R' strikes the surface $n'$ of the pin S' if the pin S' and the set-screw R' are in the positions indicated in the drawings. As the drawings show, the surfaces $m'$ and $n$ on the pin S' are somewhat longer than the surface $u'$ on the set-screw R'. When, as shown in the drawings, the surface $n'$ on the pin S' is opposite the surface U' on the set-screw R', if the pin S' is raised toward the carriage P', and the part of the beveled surface $n'$ which is farthest from the center of the machine is brought opposite the surface $u'$ on the head of the set-screw R', the carriage P' will not be allowed to travel quite so far as before in the direction of the arrow 3. If the pin S' is lowered, the carriage P' will be allowed to travel a little farther in the direction of the arrow 3.

Figs. 28, 29, and 30 are respectively a plan, side elevation, and end elevation of the carriage P', together with a partial section of the machine, such as would be made on line $z\, z$, looking in the direction indicated by the arrow 1. Fig. 31 is an end elevation of the set-screw R'.

The forming-tool B'' should be made of cylindrical shape, as shown, and with the cutting edge to conform to the shape of the model of the work which the machine is expected to reproduce.

The forming-tool B'' has a cylindrical shank which is fitted into the hole $a''$ of the tool-holder D''.

Figs. 18, 19, and 20 are respectively plan, side elevation, and end elevation of the tool-holder D''.

Figs. 21, 22, and 23 are respectively a plan, side elevation, and end elevation of the base-plate E''.

Figs. 24 and 25 are a side and end elevation of the adjusting-screw F''.

Figs. 26 and 27 are side and end elevations of the plug G.''

The hole $c''$, at a suitable distance from the hole $a''$, is drilled through the upright flange $b''$ of the tool-holder D'', and the upper end $d''$ of this hole is recessed or counterbored at a diameter large enough to extend slightly into the hole $a''$, as shown. From the lower surface of the tool-holder D'' a round boss $e''$ projects, which is concentric with the hole $c''$. The boss $e''$ fits into a corresponding recess $i''$ on the surface of the base-plate E'' when these parts are in position.

The screw F'' is short in proportion to its diameter, and at each end there are projections $j''$ and $k''$ of less diameter than the threaded surface. The projection $k''$ being slotted, the screw F'' may be adjusted by a screw-driver. A semicircular recess $f'''$, of suitable size to receive the screw F''', is made on the under side of the tool-holder D'' and at each end of this recess $f''$, and concentric with it, are smaller semicircular recesses $g''$ and $h''$ of suitable size to receive the projections $j''$ and $k''$ of the screw F'''. The depth of these semicircular recesses is such that when the screw F''' is inserted small segments of each thread project below the lower surface of the tool-holder D''. Small segments of thread $l''$ are cut on the surface of the base-plate E'' of a depth and pitch suitable to receive the projecting segments of the screw F'''. The segments of thread $l''$ are cut on a curve with the center of the hole $i''$ as a center, and the distance from the center of the hole $i''$ to the center of each segment being equal to the distance from the center of the hole $c''$ to the center of the semicircular recess $f''$.

When the tool-holder D'' is on the base-plate E'', with the projection $e''$ adjusted in the hole $i''$ and with the screw F''' adjusted in the semicircular recess $f''$, the operator can swing the tool-holder D'' on the base-plate E'' by inserting a screw-driver and turning the screw F'''. It is assumed that the screw F''' will be inserted in the recess $f''$, so that the slotted end $k''$ of the screw F''' will be toward the outside, so that the operator can turn it by a screw-driver.

The hole $m''$ is slightly elongated, so as to allow the tool-holder D'' to be swung on the base-plate E'' with the boss $e''$ as a pivot. The hole $n''$ is drilled through the base-plate E'' through the center of the circular recess $i''$. The hole $o''$ is drilled through the base-plate E'', the distance between the centers of the holes $n''$ and $o''$ being equal to the distance between the centers of the holes $c''$ and $m''$ in the tool-holder D''. The projection $e'''$ on the lower side of the base-plate E'' is made to fit the upper part of the slot $j'$ in the tool-carriage P'.

A cylindrical plug G'' of a diameter suitable to fit the recess $d''$ in the tool-holder D'' is bored out with a hole $p''$ of the same diameter as the hole $c''$ in the tool-holder D'' and the hole $n''$ in the base-plate E''. A small part of the cylindrical surface of the plug G'' is cut away, leaving a curved surface $q''$, the radius of the curve being equal to one-half the diameter of the hole $a''$ in the tool-holder D''. When the cylindrical shank of the tool B'' has been placed in the hole $a''$ of the tool-holder D'', the plug G'' is so adjusted in the recess $d''$ of the tool-holder D'' that the curved surface $q''$ comes in contact with and perfectly fits the cylindrical surface of the shank of the tool B''.

Figs. 15 and 16 are respectively an end and side elevation of the bolt H''.

The head $r''$ of the pivotal bolt H'' is made to fit the larger portion of the slot $j''$ in the carriage P'. When the parts are assembled, the pivotal bolt H'' is passed through the hole $n''$ in the base-plate E'', the hole $c''$ in the tool-holder D'', and the hole $p''$ in the plug G''', and when a nut has been screwed onto the threaded end it binds all these parts together and clamps the base-plate E'' to the carriage P'.

I''', Fig. 17, is a shorter clamping-bolt, the head $s''$ of which is also made to fit the larger portion of the slot $j''$ in the carriage P'. When the parts are assembled, the clamping-bolt I''' is passed through the hole $o''$ in the base-plate E'' and through the hole $m''$ in the tool-holder D'', and when a nut has been screwed onto the threaded end it binds these parts together and clamps the base-plate E'' to the carriage P'. Two lugs $h$ and $i$ project from the frame. Two round bars J'' and K'' extend from the lugs $h$ and $i$, being firmly fastened in both lugs. A back-rest holder L'' is fitted to slide on the bars J'' and K.

Figs. 43, 44, and 45 are respectively a side elevation, plan, and front elevation of the back-rest holder L''.

Two bars M'' and N'' of rectangular cross-section are adjusted in the holder L''. The two surfaces $t''$ and $u''$ on the lower ends of the bars M'' and N'', respectively, are at right angles to each other when the bars M'' and N'' are in position and are intended to be in contact with the revolving stock. The groove $v''$ in the upper end of the bar M'' and the groove $w''$ in the upper end of the bar N'' are fitted to receive the collars $x''$ $x''$ of the collar-screws O'' O'', which are adjusted in the holder L'' at suitable distances from the bars M'' and N'' and by their adjustment regulate the position of the bars M'' and N''. Two set-screws P'' P'' are so adjusted in the holder L'' as to hold it in position on the bars J'' and K''. The back-rest bars M'' and N'' thus have a complete adjustment both lengthwise and crosswise the machine, and the two surfaces $t''$ and $u''$ can be readily adjusted so that each comes in contact with the stock as it revolves, thus preventing undue vibration and also holding the stock against the cutting edge of the tool.

The lever K', as shown on Sheet 1, is rigid at both ends, which is the usual construction. It frequently happens, however, that operators so adjust their machines that the travel of the carriage P' is checked before the lever K' has quite finished its stroke, thus straining the machine and sometimes breaking the lever K'. For the purpose of overcoming this objection we have devised the improved form of lever Q'', as shown in Figs. 54 and 55. A flat spring R'' is fastened at one end to the lever Q'' by the bolt S'', and thence extends, with a suitable curve, to the back side of the lever Q'', where it is fastened to the lever by the bolt T'' and is also held in place by the nut U'' on the set-screw V''.

The set-screw V'' is adjusted by a screw-thread in the lever Q'', and one end rests against the spring R'', so as to furnish a means of regulating its tension. The lever W'' is hung by a pin X'' to the lever Q''. The pin X'' is held in place by a nut Y'', which is screwed up to a shoulder on the pin X''. The pin X″ is fitted to turn easily in the lever Q″, so that the lever W″ will swing on the surface of the lever Q″. A pin Z″ extends from the lever W″ parallel with the pin X″, and when in position it is in contact with the spring R″, as shown. Lines are cut at regular spaces on the surface of the lever Q″ under the end of the lever W″, so as to form the scale $y''$, the purpose of which is to indicate the contraction of the spring R″ by the throw of the lever W″, as shown by the scale $y''$. The spring R″ should be stiff enough to drive the carriage P′ without yielding at all if the machine is properly adjusted; but it will yield and prevent breaking or overstraining the machine if the travel of the carriage P′ is checked before the movement of the lever is completed.

Instead of attaching a spring to the lever we may accomplish the same purpose by combining a spring with the cam which drives the lever. Figs. 52 and 53 show a device of this kind.

A‴ is a cam-disk which may take the place of the cam-disk M′, as shown in Figs. 2 and 5, Sheet 1.

B‴ is a cam which may take the place of the cam N′, as shown on the cam-disk M′.

An elliptical spring C‴ is adjusted back of that part of the cam B‴ which is farthest from the center, the other end of the cam being hung so as to swing on the pin D‴, which is screwed into the cam-disk A‴. The spring C‴ is enlarged at one end to form a boss $z''$, which is tapped with a right-hand screw-thread in the hole $a'''$. (See Figs. 50 and 51.) The double-threaded screw E‴, Fig. 58, is threaded nearest the head with a right-hand thread of a diameter and pitch to fit the hole $a'''$ in the boss $z''$ of the spring C‴. The other end $g'''$ of the screw is of diameter small enough to be thrust through the thread of the hole $a'''$ and is threaded with a left-hand thread. The screw E‴ is adjusted in the drum-shaft C′ by its left-hand thread and is adjusted in the boss $z''$ by its right-hand thread, thus holding the spring C‴ in its position. As the screw E‴ is adjusted in the shaft by a left-hand thread, if it is turned to the right it will be withdrawn from the shaft, and as it is adjusted in the boss $z''$ by right-hand thread turning it to the right will force the boss $z''$ toward the head of the screw. The screw E‴ is so adjusted as to hold the spring C‴ against the two pins F‴ and G‴.

The spring C‴ may be elongated and its tension increased by so adjusting the screw E‴ as to force more of the spring C‴ between the two pins F‴ and G‴. The pins F‴ and G‴ are screwed into the cam-disk A‴. The pin H‴ is passed through the slot $b'''$ in the cam B‴ and is screwed into the cam-disk A‴ in such a position with reference to the slot $b'''$ that it will not interfere with slight movements of the cam B‴, but will prevent the cam from dropping off the disk in any part of the revolution of the drum-shaft.

The spring C‴ should be stiff enough not to yield unless to prevent breaking or overstraining the machine, when it will yield enough to relieve the strain of the lever.

Having thus described our invention, we now present the following claims:

1. The worm-wheel D having an annular oil-reservoir in its body and holes leading therefrom outward to its teeth and to the interior of its hub; combined with a cover removably closing said reservoir, a rectangular hollow boss thereon, channels connecting its interior with the reservoir, and a nipple carried by the boss for receiving the oil-cup, as and for the purpose set forth.

2. In a lathe, the combination with the carriage having a screw; of the frame on which the carriage moves, a pin in the frame at right angles to the length of said screw, such pin having an inclined surface contacting with the point of the screw and a groove around its outer end, a collar-screw parallel with the pin with its collar entering said groove, and means for locking the pin after adjustment, as and for the purpose set forth.

3. In a lathe, the combination with the carriage having a screw; of the frame, a pin in the frame having two differently-inclined surfaces at angles to each other adapted to contact with the point of said screw and two longitudinal grooves parallel with said surfaces, means for adjusting the pin longitudinally, and a locking set-screw adapted to engage one of said grooves, as and for the purpose set forth.

4. In a lathe, the combination with the carriage having a screw; of the frame, a pin in the frame having two inclined surfaces at different angles to the axis of the pin and at angles to each other adapted to contact with the point of the screw, means for adjusting the pin longitudinally and axially, and a locking set-screw adapted to engage the pin after its adjustment, as and for the purpose set forth.

5. The combination of the frame, the tool-carriage with the screw having two longitudinal grooves, and the locking set-screw adjusted in the carriage at right angles to and in contact with the said screw, the inner end of the locking set-screw being adapted to fit said grooves, as and for the purpose set forth.

6. In a lathe, the combination with the frame having an adjustable pin; of the carriage moving on the frame and having a lug, a set-screw through the latter at right angles to said pin and having the face of its contacting end beveled, means for adjusting said set-screw longitudinally, and a locking set-screw for holding it in adjusted position, as and for the purpose set forth.

7. In a lathe, the combination with the frame having an adjustable pin with an inclined inner end; of the carriage, a set-screw therein at right angles to said pin, means for adjusting said screw, and a locking set-screw for holding it in adjusted position, as and for the purpose set forth.

8. In a lathe, the combination with the frame, and the carriage moving thereon; of a longitudinally-adjustable pin in one member having a beveled surface, and a longitudinally-adjustable set-screw in the other member at right angles to the length of said pin and having the face of its contacting portion beveled at the same inclination as that of the pin, as and for the purpose set forth.

9. In a lathe, the combination with the frame, and the carriage; of a longitudinally-adjustable pin in one member having a beveled surface, and a longitudinally and axially adjustable set-screw in the other member at right angles to the length of said pin and having the face of its contacting portion beveled, as and for the purpose set forth.

10. In a lathe, the combination with the frame, and the carriage; of a longitudinally-adjustable pin in one member having two differently-beveled surfaces, and a longitudinally-adjustable set-screw in the other member having the face of its contacting portion beveled, as and for the purpose set forth.

11. In a lathe, the combination with the frame, and the carriage; of a longitudinally-adjustable pin in one member having two differently-beveled surfaces, a longitudinally and axially adjustable set-screw in the other member having the face of its contacting portion beveled, and means for locking this set-screw against movement after adjustment, as and for the purpose set forth.

12. In a lathe, the combination with the base-plate having a hole and a segment of threads in its face around the hole; of the tool-holder mounted on the plate and pivoted in said hole, the lower face of the holder having a recess with concentric reduced end extensions, and a screw fitting said recess and engaging the threads in the base-plate and having axial projections turning in said extensions, as and for the purpose set forth.

13. In a lathe, the combination with the base-plate having a hole through its body and a concentric enlarged recess at the upper end thereof; of the tool-holder mounted on the base-plate and having an upright hole, a boss depending from the holder concentric with said hole therein and journaled in the recess in the base-plate, and a pivotal bolt through the alined holes, as and for the purpose set forth.

14. A tool-holder having an upright flange with a transverse hole for the tool-shank, and an upright hole enlarged at one point to form a recess opening into one side of the transverse hole; combined with a cylindrical plug fitting said recess and having a cut-away portion projecting slightly into the transverse hole, said plug also having an upright hole of the size of that in the flange, and a bolt through said registering holes, as and for the purpose set forth.

15. A tool-holder having a flange with a transverse hole for the tool-shank and an upright hole enlarged at one point to form a recess opening into the transverse hole; combined with a cylindrical plug fitting said recess and having a portion projecting slightly into the transverse hole, said plug also having an upright hole of the size of that in the flange, a base-plate, a pivotal and tightening bolt passing through the alined holes in plug and flange and through the base-plate, and means for adjusting the remote end of the tool-holder on the base-plate around said bolt, as and for the purpose set forth.

16. In a lathe, the combination with the carriage having a T-shaped slot, and the base-plate having a projection entering said slot; of the tool-holder resting on the plate, a pivotal bolt passing through the holder and plate with its head engaged in said slot in the carriage, means for turning the holder around said pivot, and a clamping-bolt also passing through the holder and plate with its head in said slot, as and for the purpose set forth.

17. In a lathe, the combination with the carriage having a T-shaped slot, and the base-plate having a projection entering said slot; of the tool-holder resting on the plate and having an upright flange with a transverse hole for the tool and an upright hole for the pivotal bolt having a recess merging into the tool-hole, a plug within the recess bearing against the tool-shank, a pivotal bolt passing through the plug, holder, and plate with its head engaged in said slot in the carriage, and a clamping-bolt also passing through the holder and base-plate, as and for the purpose set forth.

18. The combination of the back-rest rods J'', and K'', fastened at their respective ends to the lugs $h$, and $i$ of the frame A, and the back-rest holder L'', adjusted on the rods J'', and K'', over the tool-carriage P', all constructed substantially as and for the purpose set forth.

19. The combination of the back-rest holder L'', and the back-rest bars M'', and N'', each independently adjusted in the back-rest holder L'', and the collar-screws O'', O'', with their collars $x''$ $x''$, made to fit the grooves $v''$, and $w''$, in the back-rest bars M'', and N'' respectively, all constructed substantially as and for the purpose set forth.

20. The combination with the back-rest rods, and the holder adjustable thereon and having a rectangular aperture; of the substantially square back-rest bars passing through and filling said aperture and having their operative surfaces at right angles to each other, and means for adjusting these bars longitudinally and independently, as and for the purpose set forth.

21. The combination with a cam; of a pivoted lever, a spring attached near its ends thereto and curving around and remote from the end of the lever which is struck by the cam, and a screw through the lever against the under side of the spring, as and for the purpose set forth.

22. The combination with a cam; of a lever having a scale marked thereon, a spring attached at one end to the lever and adapted to receive the impulse from the cam, means for adjusting the distance of the spring from the lever, and an indicator pivoted to the lever with one end moving over the scale and the other end having a pin resting under the spring, substantially as hereinbefore described.

23. The combination of the lever Q", with its scale y", the spring R", held by screws to the lever Q", the set-screw V", adjusted to regulate the tension of the spring R", and the indicating-lever W", pivoted by the pin X", so as to swing on the side of the lever Q"; all constructed substantially as and for the purpose set forth.

In witness whereof we hereunto set our hands in the presence of two witnesses.

CHARLES P. BALL.
DWIGHT E. SWEETSER.
GEORGE H. BALL.

Witnesses:
TUDOR GOWDY,
WILLIS GOWDY.